(12) United States Patent
Hiemenz et al.

(10) Patent No.: US 8,424,656 B2
(45) Date of Patent: Apr. 23, 2013

(54) ROTARY VANE MAGNETORHEOLOGICAL (MR) ENERGY ABSORBER

(75) Inventors: Gregory J. Hiemenz, Silver Spring, MD (US); Wei Hu, Greenbelt, MD (US); Grum Ngatu, Gaithersburg, MD (US); Norman Mark Wereley, Potomac, MD (US)

(73) Assignees: Techno-sciences, Inc., Calverton, MD (US); University of Maryland, College Park, College Park, MD (US)

( * ) Notice: Subject to any disclaimer, the term of this patent is extended or adjusted under 35 U.S.C. 154(b) by 265 days.

(21) Appl. No.: 12/814,708

(22) Filed: Jun. 14, 2010

(65) Prior Publication Data

US 2010/0300819 A1 Dec. 2, 2010

Related U.S. Application Data

(63) Continuation-in-part of application No. 11/818,582, filed on Jun. 15, 2007, now Pat. No. 7,874,407, which is a continuation-in-part of application No. 12/378,275, filed on Feb. 12, 2009.

(60) Provisional application No. 61/268,419, filed on Jun. 12, 2009.

(51) Int. Cl.
*F16F 9/53* (2006.01)
*F16D 57/02* (2006.01)

(52) U.S. Cl.
USPC ......... 188/267.2; 188/294; 188/296; 188/307

(58) Field of Classification Search .................. 188/267, 188/267.1, 267.2, 290, 293, 294, 296, 306, 188/307, 310
See application file for complete search history.

(56) References Cited

U.S. PATENT DOCUMENTS

| | | | | | |
|---|---|---|---|---|---|
| 3,599,906 | A | * | 8/1971 | Reinemuth | 188/290 |
| 5,573,088 | A | * | 11/1996 | Daniels | 188/267 |
| 5,944,152 | A | * | 8/1999 | Lindsay et al. | 188/296 |
| 6,907,968 | B2 | * | 6/2005 | Biasiotto et al. | 188/306 |
| 6,955,249 | B2 | * | 10/2005 | Biasiotto et al. | 188/290 |
| 7,278,522 | B2 | * | 10/2007 | Reinhardt et al. | 188/294 |
| 7,416,062 | B1 | * | 8/2008 | Arnold et al. | 188/290 |
| 7,624,850 | B2 | * | 12/2009 | Namuduri et al. | 188/290 |
| 7,686,143 | B2 | * | 3/2010 | Namuduri | 188/267.2 |

(Continued)

OTHER PUBLICATIONS

Z. Shulman, "Magnetorheological Systems and their application", Magnetic Fluids and Applications Handbook, pp. 188-229 (1996).*

*Primary Examiner* — Thomas J Williams (74) *Attorney, Agent, or Firm* — Ober, Kaler, Grimes & Shriver; Royal W. Craig (57) ABSTRACT

A rotary vane magnetorheological energy absorber, which enables a longer stroke capability in a more compact configuration than conventional magnetorheological devices, is disclosed. This novel device design is attractive for applications where long stroking capability, high force dynamic range, device size, and device weight are important. The improved magnetorheological energy absorber comprises an internal or external flow valve and a hollow body enclosing fixed and rotary vanes as well as magnetorheological fluid. Fluid flow in the valve is restricted as a solenoid is activated, thus adjusting the capability of the device to react torque. Various flow valve configurations are disclosed, as well as various motion translation mechanisms for translating linear motion to rotary motion for use of the rotary vane magnetorheological energy absorber. The improved design minimizes the amount of magnetorheological fluid required as compared to conventional linear stroke energy absorbers, thus minimizing device weight.

32 Claims, 6 Drawing Sheets

U.S. PATENT DOCUMENTS

| | | | |
|---|---|---|---|
| 2005/0121269 A1* | 6/2005 | Namuduri | 188/267.1 |
| 2006/0191756 A1* | 8/2006 | Moradian | 188/296 |
| 2007/0045068 A1* | 3/2007 | Namuduri et al. | 188/267 |
| 2008/0097269 A1* | 4/2008 | Weinberg et al. | 188/267.1 |

* cited by examiner

ROTARY VANE MAGNETORHEOLOGICAL (MR) ENERGY ABSORBER

CROSS-REFERENCE TO RELATED APPLICATION(S)

The present application derives priority from U.S. provisional patent application 61/268,419 filed 12 Jun. 2009, and is a continuation-in-part of U.S. application Ser. Nos. 11/818,582 filed Jun. 15, 2007 now U.S. Pat. No. 7,874,407 and 12/378,275 filed Feb. 12, 2009.

BACKGROUND OF THE INVENTION

1. Field of the Invention

The present invention relates generally to energy absorbers and energy absorption systems, and more particularly, to a rotary magnetorheological damper for shock and vibration energy absorption systems.

2. Description of Prior Art

The primary function of a shock and vibration protection system is to minimize the potential for equipment damage and/or personnel injury during shock and vibration loading. Such systems are important for vehicular applications, including aircraft, ground vehicles, marine vehicles, etc. Severe shock events may include harsh vertical or crash landings of aircraft, under body explosions of military ground vehicles, horizontal collisions of automobiles, and severe wave-to-hull impact of high speed watercraft. Lower amplitude shock and vibration tend to result from normal operation of such vehicles, including aircraft air loads or rotor loads, ground vehicles traversing rough terrain, etc. The severity of equipment damage and/or personnel injuries can be considerably minimized if the vehicles are equipped with shock and vibration protection systems.

Most current shock and vibration protection systems are passive, in that they cannot automatically adapt their energy absorption as a function of payload weight or as a function of real-time environmental measurements such as shock level, impact velocity, vibration levels, etc. Moreover, some energy absorbers are essentially rigid and do not stroke until the load reaches a tuned threshold. Because of this, these systems provide no isolation of vibration. This motivates the development of a shock and vibration protection system that utilizes an electronically adjustable adaptive energy absorber that can provide adaptive energy absorption for enhanced crashworthiness as well as vibration mitigation.

Magnetorheological (MR) technology is particularly attractive for shock and vibration protection systems as an MR fluid based device can offer an innovative way to achieve what is effectively a continuously adjustable energy absorber, in combination with a real-time feedback controller, can automatically adapt to payload weight and respond to changing excitation levels. With its ability to smoothly adjust its load-stroke profile, MR energy absorbers can provide the optimum combination of short stroking distance and minimum loading while automatically adjusting for the payload weight and load level. Furthermore, MR energy absorbers offer the unique ability to use the same system for vibration isolation.

One key challenge in vehicular applications involving MR energy absorbers is the device weight and size associated with providing sufficient stroke and force capability. Often, a large and massive energy absorbing device is not a possibility due to design and structural constraints. MR energy absorbers having large controllable range, stroke, and bandwidth are needed to provide adaptation to payload weight, shock energy, speed, and required energy absorption. Many MR energy absorbers for shock and vibration isolation mounts have been disclosed such that the damping level can be controlled in feedback by applying a magnetic field (U.S. Pat. No. 5,277,281 to J. D. Carlson et al., U.S. Pat. No. 6,279,700 to H. Lisenkser et al., U.S. Pat. No. 6,311,810 to P. N. Hopkins et al., U.S. Pat. No. 6,694,856 to P. C. Chen and N. M. Wereley, U.S. Pat. No. 6,953,108 to E. N. Ederfass and B. Banks, U.S. Pat. No. 6,481,546 to M. L. Oliver and W. C. Kruckemeyer, and U.S. Pat. No. 6,983,832 to C. S. Namuduri et al). See also, U.S. Pat. No. 6,694,856 issued Feb. 24, 2004 to Chen et al. which includes test data obtained from a COTS Lord Rheonetics® MR damper including force vs. piston behavior. The size and weight of these conventional linear-piston MR damper designs for such applications can make their use prohibitive. Hence, the development of more compact MR devices with the capability to adapt to shock and vibration conditions is of great interest.

SUMMARY OF THE INVENTION

Disclosed herein is a novel compact rotary vane MR energy absorber in which linear motion is converted into rotary motion so as to increase damper stroke while maintaining a compact profile. In this MR energy absorber, a rotor seated inside a hollow MR-fluid-filled body is equipped with "vanes" that rotate on a shaft inside the hollow body (vane herein being defined as any blade, fin or fluid foil mounted in a fixed position or movable, and extending either radially or axially with respect to an axis and operative on a fluid). The rotating vane(s) operate on the MR fluid interdependently with an internal stator (for example, a fixed vane) to propagate MR fluid flow through defined channel(s). Solenoid coils also mounted within the body control the MR fluid flow through those channels by changing the rheological properties of the fluid with the presence of a magnetic field, allowing control over the a reaction force on rotor vanes which, because the vanes are offset from the shaft, cause a reaction torque-moment on the shaft. The torque-moment serves as a damping force and can be further converted into a linear damping force with a rotary-to-linear motion converting mechanism.

A variety of different configurations are possible for the rotating vane(s) and internal stator.

In one exemplary embodiment, the internal stator comprises fixed vanes protruding inward from the body. The fixed vanes and rotary vane(s) separate the internal volume into two or more fluid chambers. The rotary vane(s) create a pressure-differential between the chambers. The fluid chambers are in communication with each other through either internal valves enclosed in the vanes or external by-pass valves, allowing MR fluid to flow from chamber to chamber. For example, a throttle valve mode is utilized (see, e.g., U.S. Pat. No. 5,842,547) in order to increase damping force due to a hydro-amplification effect. Different throttle valves including typical tubular or rectilinear flow mode valves and porous valves are disclosed. Electro-magnetic solenoid coils are enclosed in the corresponding valves to provide a variable magnetic field to control the rheology (apparent viscosity) of the MR fluid. As a shaft rotates along the center axis of the cylindrical body, radially-protruding rotary vane(s) mounted thereon force the MR fluid to flow through one or more valves from one fluid chamber to another. Thus, the pressure difference between the valve(s) leads to a resistant torque moment of the MR energy absorber. The torque moment can be further converted into a linear damping force with a rotation/linear motion converting mechanism such as, but not limited to a cable reel, a mechanical gearing, helical screw, etc. The resulting damping force can be varied as the applied electro-magnetic field is varied.

In another exemplary embodiment, the rotary vanes are mounted axially on the shaft and the internal stator includes fixed vanes protruding proximate the rotary vanes. The cooperating rotary and fixed vanes operate in shear mode such that, as the shaft and rotary vane(s) rotate, the MR fluid between the rotary vane(s) and the fixed vane(s) and/or body is sheared such that a resistant torque can be applied on the shaft. Electro-magnetic solenoid coils provide a variable magnetic field to control the rheology (apparent viscosity) of the MR fluid and hence the torque moment on the rotary vanes and shaft. Again, the torque moment of the shaft can be further converted into a linear damping force with a rotation/linear motion converting mechanism as described above. The resulting damping force can be varied as the applied electromagnetic field is varied.

The key benefits and payoffs of the proposed rotary vane MR energy absorber technology are as follows:
- increases stroke limit of the energy absorber while maintaining a compact damper profile;
- reduces device weight compared to conventional linear stroke MR energy absorbers for a given stroke and force requirement;
- provides a controllable damping force for shock and vibration protection applications in which protection for personnel and/or equipment can be significantly enhanced;
- eliminates the requirement of the air accumulator (used for compensating rod volume in linear stroke energy absorbers), which increases device size and can provided unwanted stiffness and/or preload force;
- passive damping for fail-safe, reduced or no power operation.

Other features, advantages and characteristics of the present invention will become apparent after the following detailed description.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

Generally, the invention disclosed herein is a novel compact rotary vane magnetorheological (MREA) energy absorber in which linear motion is converted into rotary motion and is subjected to a rotary damping force, the rotary configuration allowing increased damper stroke within a compact mechanical profile. A rotor is seated inside a hollow MR-fluid-filled body. The rotor includes vanes mounted on a shaft that together rotate inside the hollow body. The rotating vane(s) operate interdependently with an internal stator (for example, one or more fixed vanes) to propagate MR fluid flow through defined channel(s). Solenoid coils mounted within the body control the rheology (apparent viscosity) of the MR fluid flowing through those channels, allowing control over the reaction force on the vanes. Since the rotary vanes(s) are offset from the shaft, the controllable force allows adjustment of the torque-moment on the shaft. This allows adjustment of the damping force, which can be further converted into a linear damping force with a rotary-to-linear motion converting mechanism.

The invention provides a rotary vane MR energy absorber to provide adaptive damping force for shock and vibration protection applications. The conversion of the rotary motion to the linear motion makes it possible to construct a shock absorber to provide a larger stroke within a compact profile.

Figure 1:
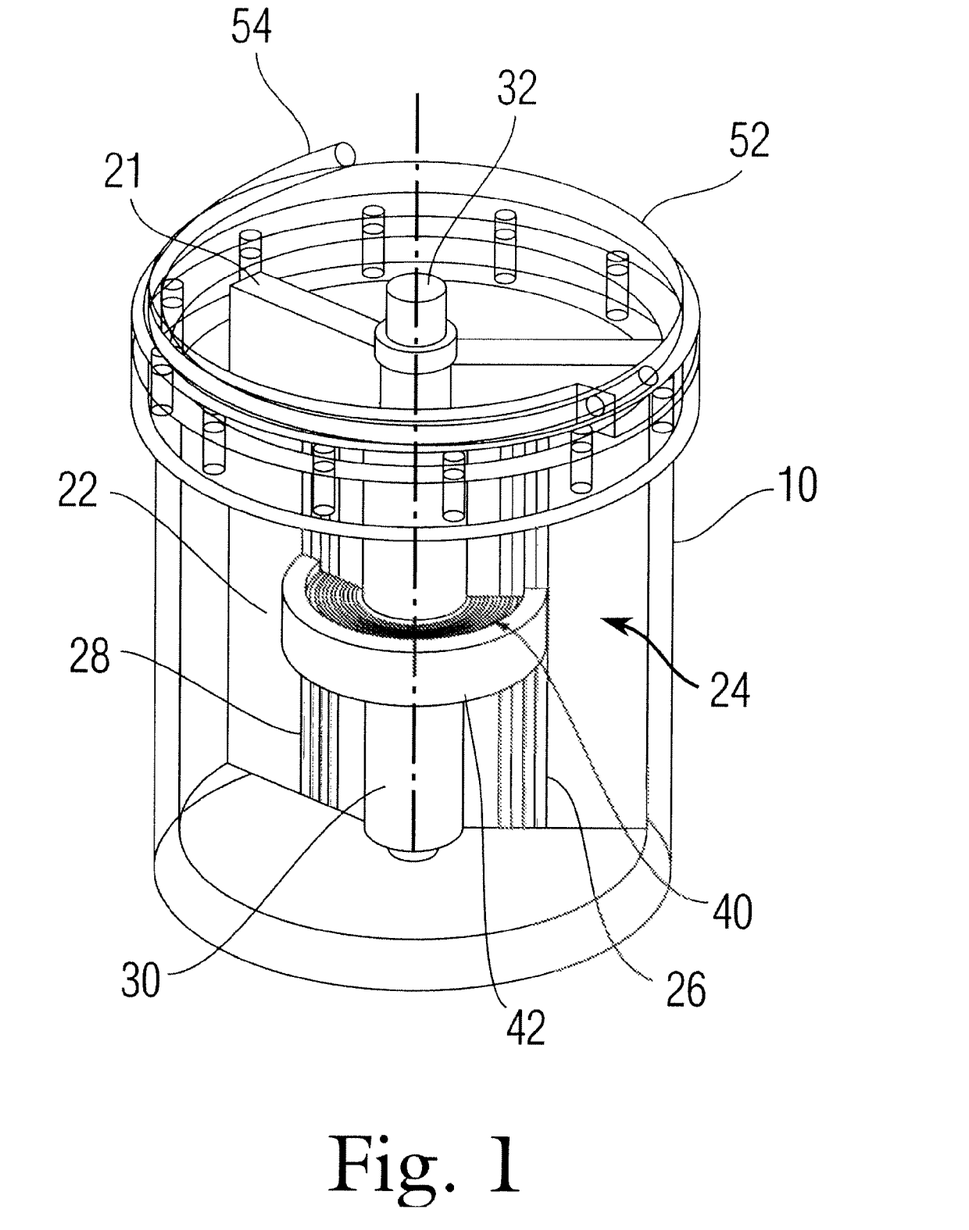
FIG. 1 is an isometric view (with a transparent body) of one embodiment of the rotary vane MREA.

A first embodiment of the rotary vane MREA of the present invention is depicted in FIG. 1. In this embodiment, the MREA comprises a cylindrical damper body 10 defining an internal cylindrical volume containing MR fluid. An internal stator comprising one or more fixed vane structures 22 protrudes radially into the internal volume of damper body 10. A shaft 30 is rotatably mounted in the damper body 10 and traverses the internal volume and one or more rotary vane structures 24 protrude radially from the shaft 30 within the cylindrical volume. In addition, a rotation/linear motion converting mechanism (here a cable reel including a cable reel wheel 52 equipped with a cable 54) is coupled to the shaft 30. Both vanes 22, 24 are rectangular structures seated radially across the cylindrical volume, and the rotary vane 24 is driven by the center shaft 30 which is made of magnetic steel. Each vane 22, 24 is made of vertical magnetic steel plates 26 arranged in columns and mounted in parallel within a non-magnetic metal frame 21. The vanes 22, 24 partition the internal volume into chambers. Between the steel plates 26 are defined fluid channels, here valve openings 28, through which MR fluid in the cylindrical volume can communicate from chamber-to-chamber. The boundary edges of the fixed vane 22 may be attached to or integrally formed with the cylindrical body 30. Each rotary vane 24 as well as the center shaft 30 can rotate along the center axis of the cylindrical body 30. The edges of the rotary vane 24 in contact with the interior cylinder surfaces may be configured with wiper seals 33. It should be apparent that turning the shaft 30 counter-clockwise will rotate the rotary vane(s) 24 toward the fixed vane 22, creating a pressure differential in the chambers there between. This pressure differential prompts the MR fluid within the cylindrical volume of body 30 to flow through the valve openings 28 between steel plates 26, equalizing the chambers.

A solenoid 40 comprising a plurality of coils is wound about the middle of the center shaft 30, and a protective plastic anti-abrasion tube 42 is placed around the solenoid coils 40. The center shaft 30, the vertical plates 26 in the vane structures 22, 24, and the MR fluid in the valve openings 28 constitute a closed-loop magnetic field path. In this configuration, a magnetic field is generated when an electric current is applied to the solenoid coil 40, and the magnetic field across the valve openings 28 is perpendicular to the flow direction of the MR fluid. The upper and lower end of the center shaft 30 may be supported by ball bearings 31 located in upper and lower end plates of the cylindrical body 10, respectively. One end of the center shaft 30 is extended out of the upper end plate of the cylindrical body 10 through a rod seal, and is connected with the rotation/linear motion converting mechanism (here a cable reel). As mentioned above, the cable reel comprises a cable reel wheel 52 and a high-strength steel cable 54, the cable reel wheel 52 being rotatably fixed to the upper end of the center shaft 30.

Figure 2:
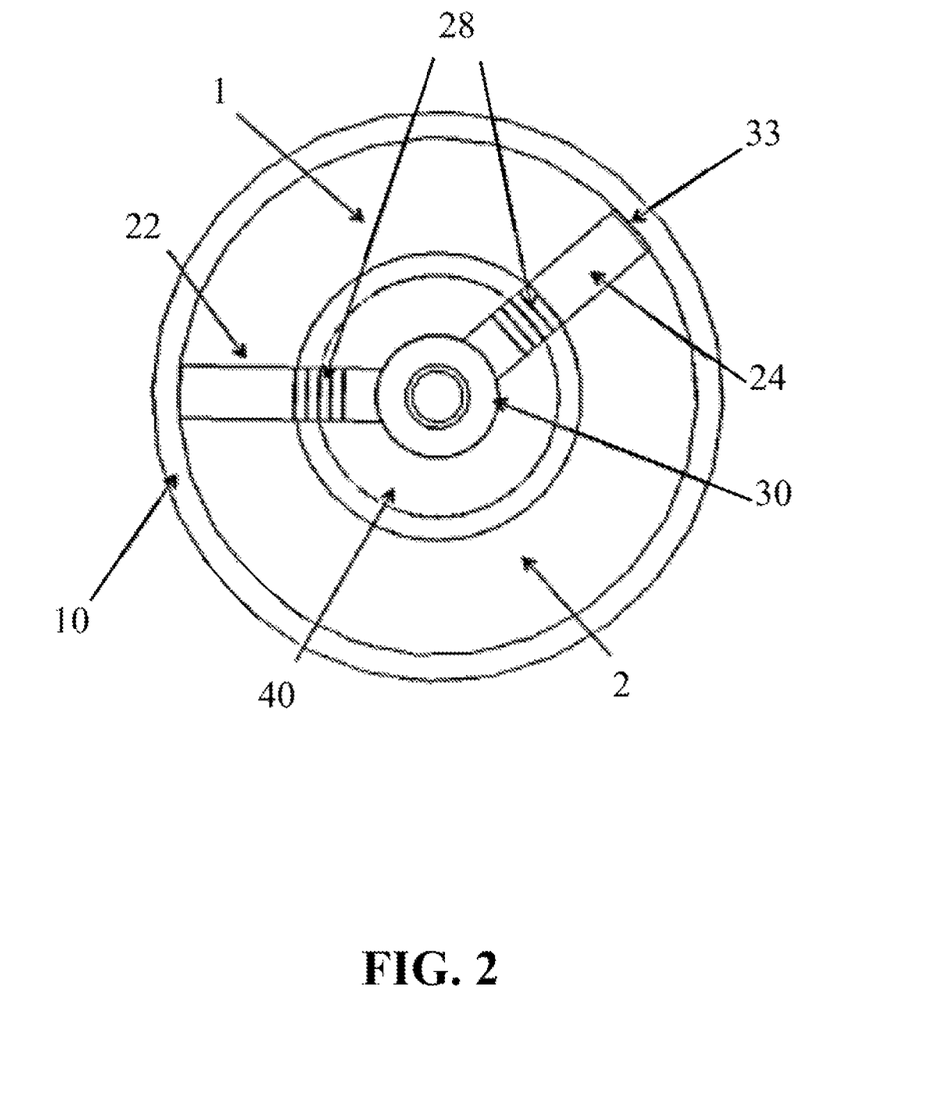
FIG. 2 is a cross sectional view of the embodiment of the rotary vane MREA in FIG. 1.

As shown in the top cross-sectional view of FIG. 2, given one fixed vane 22 and one rotary vane 24, the internal volume of the cylindrical body 10 is divided into two fluid chambers by the vane structure. The MR fluid in the fluid chamber 1 can communicate with the MR fluid in the fluid chamber 2 through the valve openings 28. As a magnetic field is applied to the MR fluid through the valve openings 28, the iron particles in the MR fluid form column-like structures along the magnetic field such that its apparent viscosity is increased. Thus the valve opening 28 in this embodiment work as a magnetic field-regulated flow valve. In operation, a linear motion of the cable 54 due to a shock/crash event can be converted into a rotation by the cable reel wheel 52, and then further transferred to the center shaft 30 and rotary vane 24. The rotation of the rotary vane 24 in the cylindrical volume forces MR fluids in one fluid chamber to flow through the valve openings 28 into the other fluid chamber. The flow resistance as the MR fluid flows through the valve opening 28 leads to a pressure difference across the flow valve. The pressure difference yields a torsional moment applied to the rotary vane 24 and further a linear stroking force applied to the cable 54 of the reel wheel 52. The stroking force can be regulated as the current applied to the solenoid coil 40 is varied since the pressure difference required to force the MR fluid to flow through the valve can be influenced by the magnetic field. Since the apparent viscosity of the MR fluid is a monotonic increasing function of the magnetic field, the pressure resistance in the flow valve and then the resultant stroking force can increase as the applied magnetic field increases.

One skilled in the art should readily understand that there are other suitable vane structures, as well as mechanical means for conversion of linear motion due to a shock/crash event into rotation. For example, rather than a cable reel wheel 52 and cable 54 a rack and pinion gear may be used, or a shaft and ballscrew may be used, such that linear motion of the rack/shaft or pinion/ballscrew turns the other.

Figure 3:
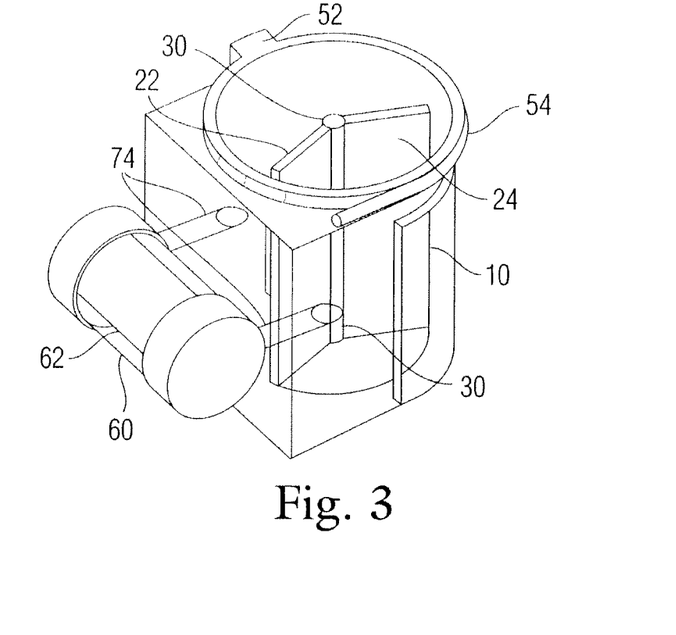
FIG. 3 is an isometric view (with a transparent body) of one optional embodiment of the rotary vane MREA with a by-pass valve body.

Referring to FIG. 3, a second embodiment of the invention is a rotary vane MREA with an external by-pass valve body 60, rather than internal valve openings 28. This embodiment likewise comprises a cylindrical damper body 10 with an internal cylindrical volume, fixed/rotary vane structures 22, 24, a rotation/linear motion converting mechanism (cable reel 52 and cable 54). The by-pass valve body 60 is external to body 30 and forms a conduit in which a rectilinear flow valve 62 is embedded. The vane structure may be identical, similarly including a fixed vane 22 and a rotary vane 24. Both vanes 22, 24 are rectangular and seated across the radial direction of the cylindrical volume, and between the fixed and rotary vane 22, 24 is a center shaft 30. The vane structures 22, 24 and center shaft 30 can be made of light metal materials, but there are no valve openings on or in the vanes themselves (as ref. 28 in FIGS. 1-2). The boundary edges of the fixed vane 22 are integrated with the internal surface of the cylindrical volume of the damper body 10. The rotary vane 24 as well as the center shaft 30 can rotate along the center axis of the shaft 30. The edges of the rotary vane 24 in contact with the internal wall of damper body 10 are again configured with wiper seals 33. The by-pass valve body 60 is connected to the cylindrical damper body 10 using hydraulic tubes 72. One end of the by-pass valve body 60 is connected to the internal volume of the damper body 10 at one side of the fixed vane 22 by a through hole 74, and the other end of the by-pass valve body is connected to the internal bore at the other side of the fixed vane 22 by the another through hole 74. The upper and lower end of the center shaft 30 is supported by ball bearings 31 located in the upper and lower end plates of the cylindrical body 10, respectively. One end of the center shaft 30 is extended out of the upper end plate of the cylindrical body 10 through a rod seal, and is connected with a rotation/linear motion converting mechanism, such as a cable reel as per above. The cable reel may comprise a cable reel wheel 52 and a high-strength steel cable 54, and the cable reel wheel 52 is fixed to the upper end of the center shaft 30.

Figure 4:
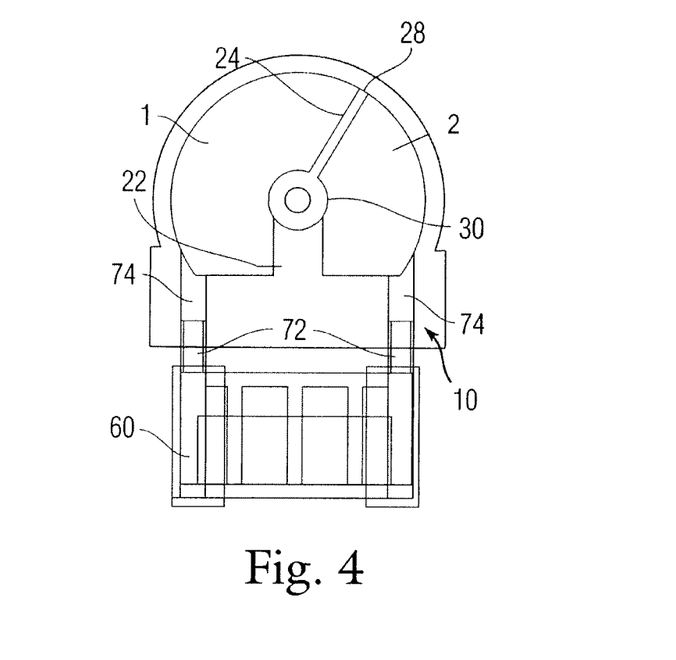
FIG. 4 is a cross sectional view of the optional embodiment of the rotary vane MREA in FIG. 3.

As shown in the top cross-sectional view of the second embodiment in FIG. 4, the internal bore in the cylindrical body 10 is divided into two fluid chambers 1, 2 by the vane structure 22, 24. At each side of the fixed vane 22, there is a through hole 74 on the wall of the cylindrical damper body 10. On the outer surface of the cylindrical body 10, each hole 74 is connected with one end of the by-pass valve body 60, respectively. Given this configuration, the MR fluid in the fluid chamber 1 can communicate with the fluid in the fluid chamber 2 through the by-pass valve 62.

Figure 5:
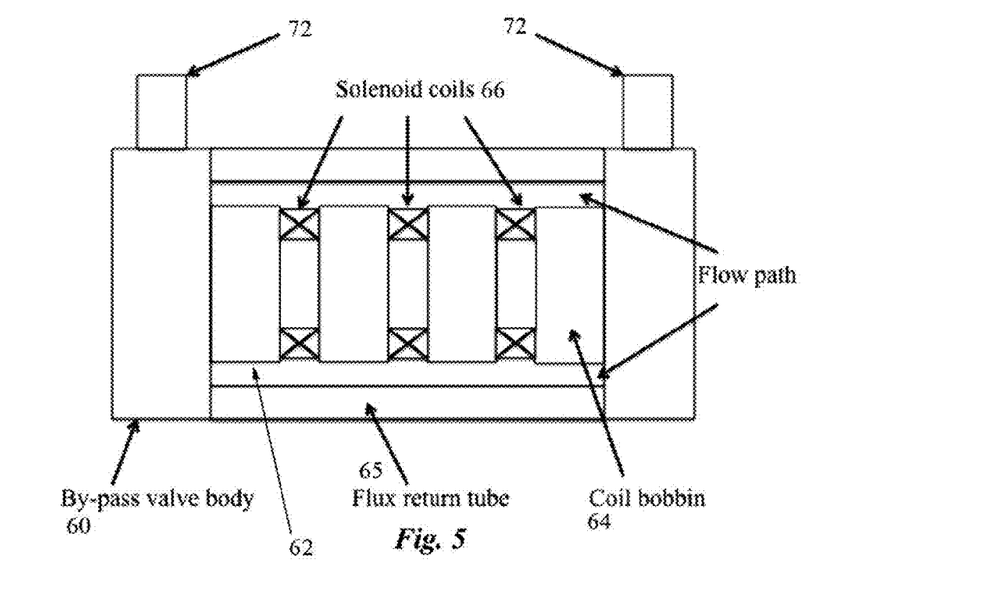
FIG. 5 is a cross-sectional view of a rectilinear flow valve in the by-pass valve body of the optional embodiment.

FIG. 5 is a cross-sectional view of a rectilinear flow valve 62 in the by-pass valve body 60 as in FIGS. 3-4. In the by-pass valve body 60 as shown in FIG. 5, a typical rectilinear valve 62 is included. The rectilinear valve 62 comprises a coil bobbin 64, a flux return tube 65 and an electro-magnetic solenoid of one or more coils 66. Both the coil bobbin 64 and flux return tube 65 are made of magnetic steel. The flow valve 62 is configured such that the coil bobbin 64, flux return tube 65 and the MR fluid flowing through the flow path constitute a closed-loop magnetic field path, and the magnetic field generated by the solenoid 66 is perpendicular to the flow direction of the MR fluid. In operation, a linear motion of the cable (FIG. 3, ref. 54) due to a shock/crash event can be converted into a rotation by the cable reel wheel 52 and further transferred to the center shaft 30 and rotary vane 24. The rotation of the rotary vane 24 in the cylindrical volume forces MR fluids in one fluid chamber to flow through the by-pass flow valve(s) 62 into the other fluid chamber. The flow resistance as the MR fluid flows through the by-pass valve(s) 62 leads to a pressure difference across the flow valve 62. The pressure difference yields a torsional moment applied to the rotary vane 24 and further a linear stroking force applied to the cable 54 of the reel wheel 52. The stroking force can be regulated as the current applied to the solenoid coil 66 is varied since the pressure difference required to force the MR fluid to flow through the valve 62 can be influenced by the magnetic field. As the applied magnetic field is stronger, the pressure resistance in the flow valve 62 is bigger since the apparent viscosity of the MR fluid is a increasing monotonic function of the magnetic field.

Figure 6:
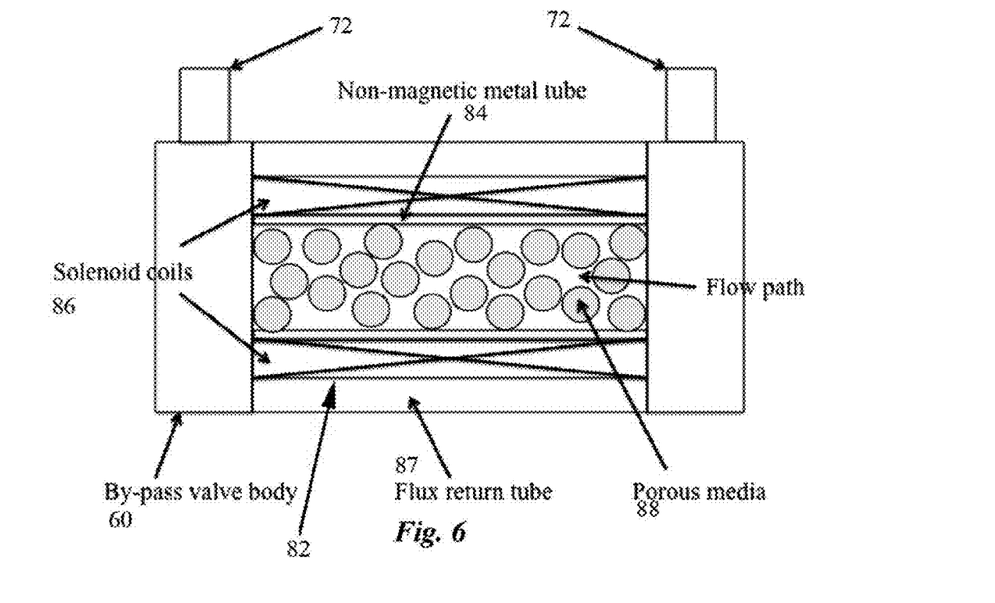
FIG. 6 is a cross-sectional view of a porous flow valve in the by-pass valve body of the optional embodiment.

A third embodiment of the rotary vane MREA is similar to the second embodiment except that a porous flow valve 82 is employed in the by-pass valve body 60 instead of a rectilinear valve 62 as in FIG. 5. As shown in FIG. 6, the by-pass valve body 60 here contains a porous flow valve 82 comprising a nonmagnetic metal tube 84 internal to the valve body 60, a solenoid coil 86 about the tube 84, a flux return tube 87, porous media 88 and valve-to-body hydraulic tube connections 72 as above. The porous media 88 may comprise multiple sphere beads or other fillers randomly or orderly-packed inside the non-magnetic metal tube 84. The solenoid coil 86 is wrapped around the metal tube 84, and the flux return tube 87 is placed around the solenoid coil 86. The hydraulic tubes 72 are used to connect the by-pass valve body 60 to the cylindrical damper body 10 as previously described. An important feature of the porous valve of FIG. 6 is that both the MR fluid and the porous media 88 are placed in the center of the solenoid and function as a magnetic flux guide. Since a tortuous flow path exists through the packed porous media 88, the flow of the MR fluid through the porous valve 82 is not unidirectional and the local magnetic field has various orientations relative to the velocity of the MR fluid. In such a configuration, mean values of the magnetic field applied to the MR fluid depend on material properties and the geometric shape of the porous media 88, and the valve design is flexible. Comparatively, in conventional rectilinear flow mode valves, the fluid channel has to be configured so that the MR fluid flows perpendicular to the magnetic field, which places numerous geometric constraints on valve and magnetic coil design. Another feature of the porous valve 82 that improves efficiency and effectiveness is the tortuous fluid channels existing in the porous media. First, the active fluid channel length can be increased by the curvedness of the fluid channel, and second, both yield and viscous behavior of the MR fluid can be affected by the applied magnetic field due to the capillary style of channel.

One skilled in the art should readily understand that there are other suitable configurations for the porous valve. For example, rather than porous media included in center nonmetal tube and a coil wrapped around the tube, a tubular valve may be use, in which the porous media is sandwiched between an inner tube and a outer tube and the coil is wrapped around the inner tube. A variety of porous valve configurations are shown and described in Applicant's co-pending U.S. application Ser. No. 11/818,582, which is herein incorporated by reference.

In operation, when the cable reel wheel 52 rotates due to a shock/crash event, the rotary vane 24 pushes the MR fluid from, for example, the MR fluid chamber into one end of the by-pass valve body 60 through the hydraulic tube. As the MR fluid flows into the porous valve 82, the MR fluid passes through the packed porous media 88 and is exposed by an applied magnetic field. The MR fluid then exits the porous valve 82 and enters the MR fluid chamber 2 through the hydraulic tube 72. As shown above, when the rotary vane 24 rotates, the MR fluid must pass through the flow path in the porous media 88 in which the yield stress and viscosity of the MR fluid therein are controlled by an applied magnetic field.

A fourth embodiment of the rotary vane MREA comprises one or more axially-mounted rotary vane(s) mounted on the shaft (rather than radial vanes 24, and a cooperating stator structure, which operate by a shear motion rather than pressure differential. The axially-mounted rotary vane(s) shear through the MR fluid, and shear resistance creates a torque-moment and damping force. A solenoid-induced magnetic field controls the shear resistance to rotation of the axially-mounted rotary vane(s), as before allowing control over the torque moment on rotor and shaft. The torque-moment can be further converted into a linear damping force with a rotary-to-linear motion converting mechanism.

Figure 7:
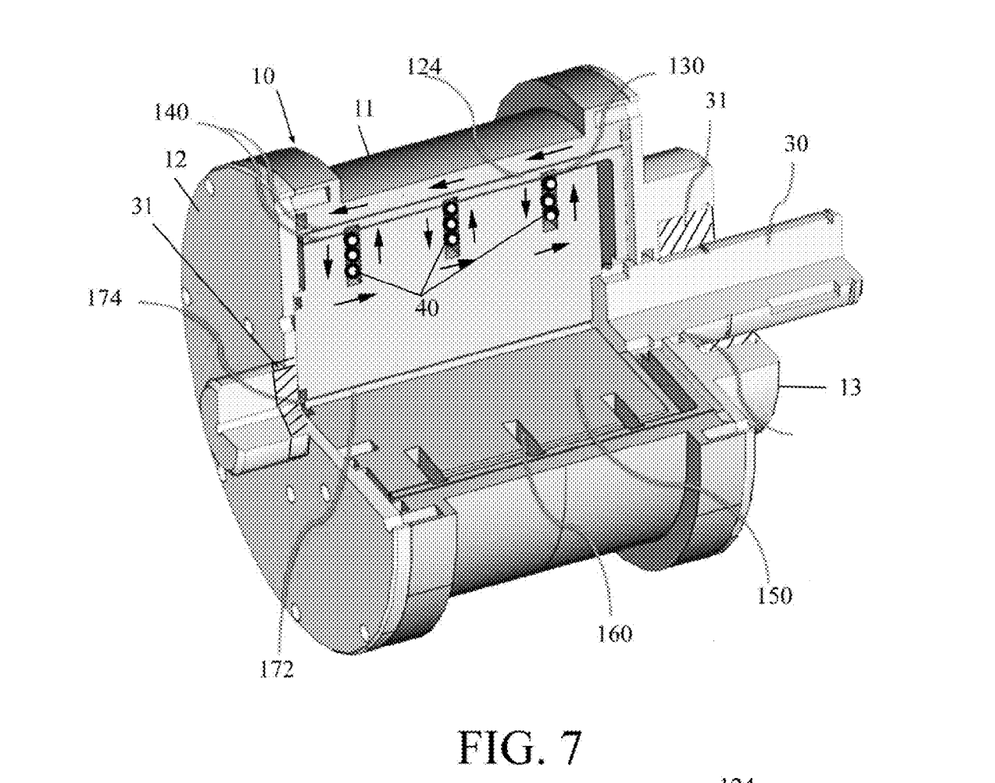
FIG. 7 is a perspective drawing with a sectioned quarter of a fourth embodiment of the rotary vane MREA of the present invention.

The fourth embodiment of the rotary vane MREA of the present invention is depicted in the perspective drawing of FIG. 7. In this embodiment, the MREA comprises a cylindrical damper body 10 defining an internal cylindrical volume containing MR fluid. The cylindrical damper body 10 may or may not be equipped (or formed) with an internal stator structure as described below. In the illustrated embodiment the damper body 10 is comprises of three separate parts: a cylindrical midsection 11, and opposing disk end plates 13 screwed or otherwise attached to midsection 11.

As above, a shaft 30 is rotatably mounted in the damper body 10 via shaft bearings 31 (and/or bearing seals) and traverses the internal volume. At least one axially-oriented (generally cup-shaped) rotary vane structure 124 is driven by the shaft 30 within the cylindrical volume, and may be attached to the shaft 30 by its closed end. As described below, a plurality of progressively smaller rotary vane structures 124 may optionally be mounted on the same shaft 30 in a concentric manner.

Figure 8:
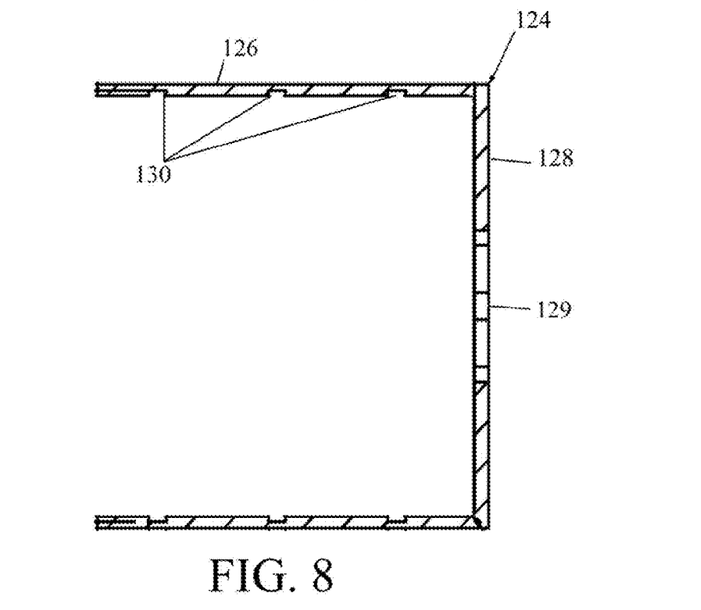
FIG. 8 is a cross-sectional view of the axial rotary vane structure used in the fourth embodiment of FIG. 7.

FIG. 8 is a cross-sectional view of the axial rotary vane structure 124 including a closed end 128 with keyed aperture 129 for attachment to shaft 30, and annular sidewalls 126 that rotate within the confines of the cylindrical body 10. The axial rotary vane structure 124 is defined by a plurality of annular grooves 130 spaced along the interior surface of the annular sidewalls 126.

Referring back to FIG. 7, the rotary vane structure 124 rotates about an internal stator which is herein formed as solenoid coils 40 wound about a bobbin 150. Bobbin 150 is stationery with respect to the body 10 and may be attached or integrally formed with end plate 12. Bobbin 150 is defined by a plurality of annular grooves 160 for winding the solenoid coils, and the grooves 160 in bobbin 150 correspond to the annular grooves 130 spaced along the interior surface of the annular sidewalls 126. The rotary vane structure 124 is very slightly smaller in diameter than the interior of the body 10 to allow free rotation and to define an MR fluid gap 140 between the rotary vane structure 124 and body 10. Similarly, the rotary vane structure 124 is very slightly larger in diameter than the bobbin 150 to allow free rotation there about and to define an MR fluid gap 140 between the rotary vane structure 124 and bobbin 150. The solenoid coils 40 in the grooves 160 of bobbin 150 may be connected externally through a central wire path 172 through the bobbin 150, and sealed by a wire seal plug 174 or suitable filler to prevent fluid leakage between the wire and cylindrical body 10. In this manner, the coils 40 may be connected to an external power supply. The shaft 30 protrudes out at one end of the body 10, here through side plate 13.

In operation, fluid shear flow occurs down the entire axial length of the rotary vane structure 124 within MR fluid gap 140 occurring between the rotary vane 124 and the cylindrical body 10 as well as the gap 140 between the rotary vane structure 124 and the bobbin 150.

As above, a rotation/linear motion converting mechanism such as a cable reel may be coupled to the protruding end for linear-to-rotary motion translation. The axial rotary vane 124 is made of magnetic steel, and rotates along with the center shaft 30 along the center axis of the cylindrical body 10. Turning the shaft 30 will turn the rotary vane 124 and create a shearing effect against the MR fluid resident in the gap 140 between the rotary vane structure 124 and body 10, as well as that between the rotary vane structure 124 and bobbin 150. Thus, both internal and external surfaces of the rotary vane structure 124 contact the MR fluid.

The cylindrical body 10, the rotary vane 124, and the MR fluid in the in the MR fluid gaps 140 constitutes a closed-loop magnetic flux path around each coil 40 (shown by arrows). In this configuration, a magnetic field is generated when an electric current is applied to the solenoid coils 40 in the grooves 160 of bobbin 150, and the magnetic field across the rotary vane 124 is perpendicular to the flow direction of the MR fluid in the flow gaps between the rotor vane and the body/fixed vane 130. As the magnetic field is applied to the MR fluid in the MR fluid gaps 140, the iron particles in the MR fluid form column-like structures along the magnetic field such that its apparent viscosity is increased. In operation, a linear motion imparted to the rotation/linear motion converting mechanism (such as cable reel, not shown) is converted to rotary motion transmitted to the center shaft 30 and axial rotary vane 124. The rotation of the rotary vane 124 in the cylindrical volume creates a shearing action against the MR fluids in flow gaps 140. The shear resistance of the MR fluid yields a torsional moment applied to the rotary vane 124 and further a linear stroking force applied to the rotation/linear motion converting mechanism. The stroking force can be regulated as the current applied to the solenoid coils 40 is varied since the MR fluid shear resistance can be influenced by the magnetic field.

The annular grooves 130 in the rotary vane 124 serve to increase the flux density in the outer gap 140 between the rotary vane structure 124 and body 10.

The number of solenoid coils 40 is preferably a multiple of the number of the grooves 130 in vane 124, and may be equal in number. The variable magnetic field leads to a controllable shear stress in the MR fluid and a controllable resistive torque of the damper.

If desired, optional features such as a fluid level indicator (window) may be provided in body 10 to monitor the quantity of the MR fluid in the damper, and/or an MR fluid vent may be employed to compensate fluid volume variation due to temperature fluctuation.

Figure 9:
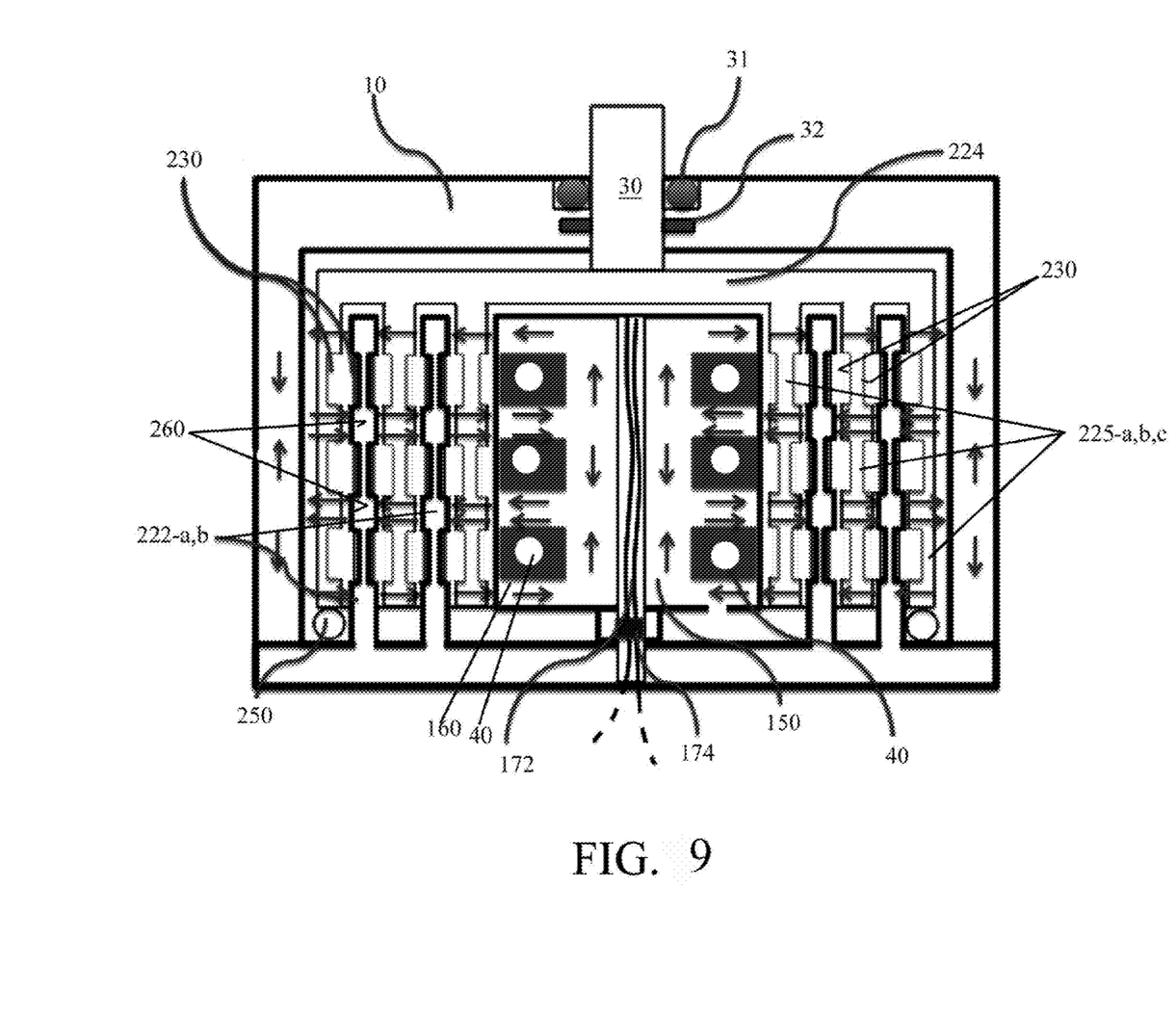
FIG. 9 is a perspective side cross section of the rotary vane MREA incorporating a multiple-concentric-axial rotary vane structure.

As mentioned briefly above, multiple co-axial rotary vanes 124 may be mounted concentrically on the shaft 30 for combined rotation. In this case to ensure maximum shear resistance, the stator structure is preferably expanded to extend a stationery vane between each concentric pair of rotary vanes.

FIG. 9 is a perspective side cross section of a rotary vane MREA incorporating a multiple-concentric-axial rotary vane structure. A shaft 30 is rotatably mounted in the damper body 10 via shaft bearings 31 and bearing seals 32, and traverses the internal volume. The rotary vane structure 224 here comprises three concentric cup-shaped annular sidewalls 225-a,b,c riding on the shaft 30 within the cylindrical volume, all attached to the shaft 30 by their closed end in a concentric manner for common rotation within the confines of the cylindrical body 10. Both walls of the innermost sidewalls 225-b,c, plus the inner wall of the outermost sidewall 225-a are defined by grooves 230 spaced along the surface which provide increased magnetic flux density. The rotary vane structure 124 rotates about an internal stator structure which is herein formed as solenoid coils 40 wound about a bobbin 150. Bobbin 150 is stationery with respect to the body 10 and may be attached or integrally formed with end plate 12. Bobbin 150 is defined by a plurality of annular grooves 160 for winding the solenoid coils, and the grooves 160 in bobbin 150 correspond to the grooves 230 in annular sidewalls 225-a,b,c. Sidewalls 225-a,b,c are progressively smaller in diameter to allow free rotation and to define an MR fluid flow path between each and body 10. The stator structure also includes one or more stationary vanes 222-a,b (here two) each fixed to the cylinder body 10 and each dividing the interim space between sidewalls 225-a,b,c into two gaps. Similar grooves 260 are applied in stationary vanes 222-a,b to increase flux density in the gaps. The increased shear area of the rotary vane structure 224 increases the output resistant torque or damping force while maintaining a compact damper volume.

The solenoid coils 40 in the grooves 160 of bobbin 150 may be connected externally through a central wire path 172 and sealed by a wire seal plug 174 for connection to an external power supply. If necessary, additional bearings 250 may be provided to support the rotor vane structure 224. The shaft 30 protrudes out at one end of the body 10 and a rotation/linear motion converting mechanism as per above may be connected. Turning the shaft 30 will turn all the annular sidewalls 225-a,b,c of rotary vane 224 and will create an enhanced shearing effect against the MR fluid between the rotary vane structure 224, body 10, and bobbin 150. The cylindrical body 10, the rotary vane 224, and the MR fluid the in the MR fluid flow paths 140 constitutes a closed-loop magnetic flux path (shown by arrows). The magnetic field is generated when an electric current is applied to the solenoid coils 40 in the grooves 160 of bobbin 150, and the magnetic field across the rotary vane 124 is perpendicular to the flow direction of the MR fluid in the flow gaps between the annular sidewalls 225-a,b,c of rotary vane 224 and the interim fixed vanes 222-a,b and bobbin 150. Operation is similar to the embodiment of FIG. 7. The rotation of the rotary vane 224 in the cylindrical volume creates a shearing action against the MR fluids, the shear resistance of the MR fluid yields a torsional moment applied to the rotary vane 224 and a stroking force applied to the rotation/linear motion converting mechanism. The stroking force can be regulated as the current applied to the solenoid coils 40 is varied since the MR fluid shear resistance can be influenced by the magnetic field.

Other optional features for this embodiment are similar to the single rotary vane damper of FIG. 7.

In all the above-embodiments, a rotary MR energy absorber is disclosed that increases stroke limit of the energy absorber while maintaining a compact damper profile, thereby reducing weight compared to conventional linear stroke MR energy absorbers for a given stroke and force requirement.

Therefore, having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A rotary vane magnetorheological energy absorber (MREA) comprising:
    a hollow body defining an internal volume containing magnetorheological (MR) fluid;
    a damping mechanism comprising
        a shaft traversing said hollow body and rotatable within said internal volume about an axis,
        at least one fixed vane extending radially toward said shaft within said internal volume that does not rotate,
        at least one rotary vane operatively coupled with said shaft and extending radially therefrom for rotation therewith in said internal volume, said fixed vane and said rotary vane separating said internal volume into a plurality of MR fluid chambers; and
    at least one solenoid coil wound about said axis within said internal volume for generating a variable magnetic field that changes the properties of the MR fluid to selectively resist motion of the rotary vane with respect to the fixed vane.

2. The rotary vane MREA of claim 1, further comprising a fluid connection between at least two of said MR fluid chambers, whereby variation in the magnetic field generated by said at least one solenoid coil controllably restricts the flow of fluid through said fluid connection.

3. The rotary vane MREA of claim 2, wherein said fluid connection comprises a valve.

4. The rotary vane MREA of claim 3, wherein rotation of said rotary vane forces the MR fluid in one of said MR fluid chambers to flow into another of said MR fluid chambers through said valve.

5. The rotary vane MREA of claim 3, wherein rotation of said rotary vane causes a pressure difference across said valve.

6. The rotary vane MREA of claim 2, wherein each of the at least one rotary vanes comprises a plurality of magnetic steel plates within a non-magnetic metal frame, said magnetic steel plates arranged in parallel and in alignment with said axis.

7. The rotary vane MREA of claim 6, further comprising at least one opening between the plurality of steel plates of said at least one rotary vane.

8. The rotary vane MREA of claim 7, wherein said rotating shaft, said parallel steel plates, and the MR fluid flowing through the said opening between said parallel steel plates constitute a closed-loop magnetic field path.

9. The rotary vane MREA of claim 7 wherein the motion of the at least one rotary vane causes shear flow of the MR fluid in said opening between the plurality of steel plates.

10. The rotary vane MREA of claim 2, wherein each of the at least one fixed vanes comprises a plurality of magnetic steel plates within a non-magnetic metal frame, said magnetic steel plates arranged in parallel and in alignment with said axis.

11. The rotary vane MREA of claim 10, further comprising at least one opening between the plurality of steel plates of said at least one fixed vane.

12. The rotary vane MREA of claim 11, wherein said rotating shaft, said parallel steel plates, and the MR fluid flowing through said opening between said parallel steel plates constitute a closed-loop magnetic field path.

13. The rotary vane MREA of claim 11 wherein the motion of the at least one rotary vane causes shear flow of the MR fluid in said opening between the plurality of steel plates.

14. The rotary vane MREA of claim 2, wherein said fluid connection comprises a fluid flow path through at least one rotary vane or at least one fixed vane to share fluid exchange between said MR fluid chambers.

15. The rotary vane MREA of claim 1, wherein the hollow body is a hollow cylinder, and said at least one fixed vane is stationary within the cylindrical body.

16. The rotary vane MREA of claim 15, wherein the at least one fixed vane is integrally joined to the hollow cylindrical body.

17. The rotary vane MREA of claim 1, further comprising a motion translation mechanism for converting rotational shaft motion to linear motion.

18. The rotary vane MREA of claim 17, wherein said motion translation mechanism comprises any one of a cable reel wheel, a rack and pinion gear, and a threaded shaft with ballscrew.

19. A rotary vane magnetorheological energy absorber (MREA) comprising:
   a hollow body defining an internal volume containing magnetorheological (MR) fluid;
   a damping mechanism comprising,
      a shaft traversing said hollow body and rotatable within said internal volume about an axis,
      a plurality of concentric rotary vanes each having cylindrical sidewalls and each coaxially coupled to said shaft for rotation about said axis, and
   at least one fixed vane having cylindrical sidewalls positioned coaxially with said axis and received between said cylindrical sidewalls of said plurality of concentric rotary vanes; and
   a fixed stator comprising a cylindrical body positioned coaxially with said axis and at least one solenoid coil wound about said cylindrical stator body for generating a variable magnetic field that changes the properties of the MR fluid.

20. The rotary vane MREA of claim 19 wherein an outer surface of said cylindrical sidewalls of said at least one fixed vane comprises at least one annular groove.

21. The rotary vane MREA of claim 20 wherein an outer surface of said cylindrical sidewalls of said at least one rotary vane further comprises at least one annular groove positioned for cooperative alignment with said at least one annular groove of said at least one fixed vane.

22. The rotary vane MREA of claim 19 wherein said at least one fixed vane comprises a first fixed vane about said stator and a second fixed vane about said first fixed vane, and said plurality of concentric rotary vanes further comprise a first rotary vane received between said stator and said first fixed vane, and a second rotary vane received between said first fixed vane and said second fixed vane, said plurality of rotary vanes defining a plurality of shear flow gaps, wherein the cylindrical sidewalls of said at least one fixed vane is received within one of said shear flow gaps.

23. The rotary vane MREA of claim 19 wherein the cylindrical sidewalls of said at least one fixed vane, the cylindrical sidewalls of said plurality of rotary vanes, said hollow body, the cylindrical stator body, and the MR fluid in the shear flow gaps constitute a closed loop magnetic field path.

24. A magnetorheological (MR) energy absorber, comprising:
   a body defining an internal volume;
   MR fluid contained within said internal volume;
   a rotatable shaft traversing the internal volume of said body;
   a rotary vane mounted interiorly of said body, said rotary vane being attached to said rotatable center shaft;
   a fixed vane attached to said body, said fixed vane and said rotary vane partitioning said internal volume into a first chamber and a second chamber;
   an MR fluid flow path out of said first chamber and into said second chamber,
   an MR fluid flow control valve positioned along said MR fluid flow path; and
   a solenoid defined by a plurality of coils wrapped about said rotatable shaft for generating a magnetic field when an electric current is applied to the solenoid;
   and
   a linear-to-rotary motion translation mechanism coupled to said rotatable shaft
   wherein rotation of said shaft moves said rotary vane to compress the MR fluid in said first chamber, thereby applying a resistant torque moment to said shaft.

25. The MR energy absorber according to claim 24, further comprising a fixed vane attached to said body, said fixed vane coaxially received within said rotary vane, wherein rotation of said rotary vane shears the MR fluid in said body, thereby applying a shear resistance torque moment to said center shaft.

26. The MR energy absorber according to claim 24, wherein said MR fluid flow path comprises valve openings through said rotary vane.

27. The MR energy absorber according to claim 24, wherein said MR fluid flow path comprises a conduit from said first chamber to said second chamber.

28. The MR energy absorber according to claim 24, wherein said translation mechanism comprises a cable reel.

29. The MR energy absorber according to claim 24, wherein said
- MR fluid flow control valve positioned along said MR fluid flow path further comprises a flux return tube, a solid body coil bobbin within said tube and defining a void between an internal surface of said tube and said coil bobbin, and at least one solenoid wound about said coil bobbin;
- wherein rotation of said shaft moves said rotary vane to compress the MR fluid in said first chamber and thereby force said MR fluid to flow through said void toward said second chamber, and wherein said at least one coil selectively generates a variable magnetic field that changes a property of the MR fluid to selectively resist said flow and thereby apply a resistant torque moment opposing rotation of said shaft.

30. The magnetorheological (MR) energy absorber of claim 29 wherein said bobbin further comprises at least one annular channel in which said at least one solenoid is wound.

31. The magnetorheological (MR) energy absorber of claim 29 wherein the said bobbin and said flux return tube are made from magnetic steel.

32. The magnetorheological (MR) energy absorber of claim 31 wherein the said bobbin, said flux return tube, and the MR fluid flowing through the said void constitute a closed-loop magnetic field path.

* * * * *